US009767023B2

(12) United States Patent
Sukenari

(10) Patent No.: US 9,767,023 B2
(45) Date of Patent: Sep. 19, 2017

(54) METHOD OF CONTROLLING DATA WRITING TO PERSISTENT STORAGE DEVICE

(71) Applicant: NEC CORPORATION, Tokyo (JP)

(72) Inventor: Teruki Sukenari, Tokyo (JP)

(73) Assignee: NEC CORPORATION, Tokyo (JP)

( * ) Notice: Subject to any disclaimer, the term of this patent is extended or adjusted under 35 U.S.C. 154(b) by 120 days.

(21) Appl. No.: 14/893,998

(22) PCT Filed: May 19, 2014

(86) PCT No.: PCT/JP2014/002620
§ 371 (c)(1),
(2) Date: Nov. 25, 2015

(87) PCT Pub. No.: WO2014/199568
PCT Pub. Date: Dec. 18, 2014

(65) Prior Publication Data
US 2016/0110285 A1    Apr. 21, 2016

(30) Foreign Application Priority Data
Jun. 12, 2013    (JP) .................................. 2013-123717

(51) Int. Cl.
*G06F 12/08* (2016.01)
*G06F 12/0806* (2016.01)
(Continued)

(52) U.S. Cl.
CPC ........ *G06F 12/0806* (2013.01); *G06F 3/0604* (2013.01); *G06F 3/065* (2013.01);
(Continued)

(58) Field of Classification Search
CPC .. G06F 12/0806; G06F 3/0604; G06F 3/0647; G06F 3/065; G06F 3/067; G06F 17/30132
See application file for complete search history.

(56) References Cited

U.S. PATENT DOCUMENTS 9,075,710 B2 * 7/2015 Talagala ............... G06F 12/0246
9,262,323 B1 * 2/2016 Shankaran ........ G06F 17/30212
(Continued)

FOREIGN PATENT DOCUMENTS

JP          8-16444 A        1/1996
JP     2000-89996 A        3/2000
(Continued)

OTHER PUBLICATIONS

Communication dated Dec. 27, 2016 from the Japanese Patent Office in counterpart application No. 2015-522498.
(Continued)

*Primary Examiner* — Ryan Bertram
(74) *Attorney, Agent, or Firm* — Sughrue Mion, PLLC

(57) ABSTRACT

A second computer transmits, to a first computer, confirmation data including identification information and a version number of copy data updated in a cache. Based on the confirmation data received from the second computer and information stored in the persistent storage device, the first computer extracts the identification information and the version number corresponding to the copy data to be written to the persistent storage device, from the confirmation data, and transmits response data including the extracted identification information and the version number to the second computer. Based on the response data received from the first computer and information stored in the cache, the second (Continued)

computer determines the copy data in the cache to be transmitted to the first computer so as to be written to the persistent storage device.

18 Claims, 14 Drawing Sheets

(51) Int. Cl.
    *G06F 17/30*     (2006.01)
    *G06F 3/06*     (2006.01)

(52) U.S. Cl.
    CPC ............ *G06F 3/067* (2013.01); *G06F 3/0647* (2013.01); *G06F 17/30132* (2013.01); *G06F 2212/62* (2013.01)

(56) References Cited

U.S. PATENT DOCUMENTS

| | | |
|---|---|---|
| 2007/0299958 A1 | 12/2007 | Hu |
| 2012/0204024 A1* | 8/2012 | Augenstein ......... G06F 11/1453 713/150 |
| 2013/0054869 A1* | 2/2013 | Tolia ................... G06F 12/0871 711/102 |
| 2013/0103729 A1* | 4/2013 | Cooney ............. G06F 17/30126 707/831 |
| 2014/0359043 A1* | 12/2014 | Gao ...................... G06F 15/167 709/212 |
| 2015/0012539 A1* | 1/2015 | McHugh ............. G06F 17/3023 707/737 |

FOREIGN PATENT DOCUMENTS

| | | |
|---|---|---|
| JP | 2000-339211 A | 12/2000 |
| JP | 2005-216167 A | 8/2005 |
| JP | 2006-235736 A | 9/2006 |
| JP | 2012-108889 A | 6/2012 |
| JP | 2014-505944 A | 3/2014 |
| WO | 2008/149552 A1 | 12/2008 |

OTHER PUBLICATIONS

Communication dated Mar. 14, 2017 issued by the Japanese Patent Office in counterpart application No. 2015-522498.

Takuya Araki, et al., "A masterless DB synchronization system and its application to a seamless video watching system", IPSJ SIG Technical Report, Feb. 17, 2006, pp. 299-304, vol. 2006, No. 14.

Toshio Tonouchi et al., "Persistent caching algorithm on distributed environment", IEICE Technical Report, Jul. 20, 1990, pp. 79-84, vol. 90, No. 144.

Takamichi Tateoka et al., "PFS: A Dynamically Adaptive File System for Networking Environments", Computer Software, Mar. 16, 1998, pp. 62-81, vol. 15, No. 2.

International Search Report for PCT/JP2014/002620 dated Aug. 26, 2014.

* cited by examiner

FIG. 7

| CACHE NODE 1 | CACHE DATA ID | OLD ← UPDATE HISTORY [VERSION NO/UPDATED DATA] → NEW | | | |
|---|---|---|---|---|---|
| | 1 | T1_1_1 / D1_1_1 | T1_1_2 / D1_1_2 | T1_1_3 / D1_1_3 | T1_1_4 / D1_1_4 |
| | 2 | T1_2_1 / D1_2_1 | T1_2_2 / D1_2_2 | | |
| | 3 | T1_3_1 / D1_3_1 | T1_3_2 / D1_3_2 | T1_3_3 / D1_3_3 | |

| CACHE NODE 2 | CACHE DATA ID | OLD ← UPDATE HISTORY [VERSION NO/UPDATED DATA] → NEW | | |
|---|---|---|---|---|
| | 2 | T2_2_1 / D2_2_1 | T2_2_2 / D2_2_2 | T2_2_3 / D2_2_3 |
| | 3 | T2_3_1 / D2_3_1 | T2_3_2 / D2_3_2 | |

| CACHE NODE 3 | CACHE DATA ID | OLD ← UPDATE HISTORY [VERSION NO/UPDATED DATA] → NEW | | | |
|---|---|---|---|---|---|
| | 1 | T3_1_1 / D3_1_1 | | | |
| | 4 | T3_4_1 / D3_4_1 | T3_4_2 / D3_4_2 | T3_4_3 / D3_4_3 | T3_4_4 / D3_4_4 |

DIAL TONE GENERATED BY CACHE NODE 2

FIG. 10

PERSISTENCE TABLE
LIST OF VERSION NO. OF CACHE DATA 1, 2, 3 MADE PERSISTENT BY STORAGE NODE 4

| CACHE DATA ID | VERSION NO./DATA |
|---|---|
| 1 | (NULL) |
| 2 | T4_2 / D4_2 |
| 3 | T4_3 / D4_3 |

METHOD OF CONTROLLING DATA WRITING TO PERSISTENT STORAGE DEVICE

CROSS REFERENCE TO RELATED APPLICATIONS

This application is a National Stage of International Application No. PCT/JP2014/002620 filed May 19, 2014, claiming priority based on Japanese Patent Application No. 2013-123717 filed Jun. 12, 2013, the contents of all of which are incorporated herein by reference in their entirety.

TECHNICAL FIELD

The present disclosure relates to a method of controlling data writing to a persistent storage device, a computer system, a storage computer, a cache computer, and a program.

BACKGROUND

Recently, as mobile phones and the Internet have been widely used, the amount of data to be handled is increased. As such, it is advantageous to process a large amount of data at a higher speed. In such a situation, as a system for storing a large amount of data, a demand for a key value store (KVS) is increasing. In a key value store, data (value) is associated with a unique sign (key), and they are stored in a pair. Hereinafter, data in which a key and a value are paired is called KV data. In particular, a system having a function capable of storing units of KV data distributedly in a plurality of servers is called a distributed KVS. A distributed KVS, which is a type of a distributed database, is mainly used in a system not requiring data consistency strongly but focusing on scalability and throughput.

SUMMARY

It is an aspect to provide a controlling method that controls reflection of data on a persistent storage device. It is another aspect to provide a controlling method in which transmitting and receiving data between computers wastefully are reduced.

A method of controlling data writing to a persistent storage device, according to a first exemplary aspect of the present disclosure, is a method of controlling writing of data held in a cache in a computer system. The computer system includes a first computer and a plurality of second computers. The first computer includes a persistent storage device that stores a set of data, identification information of the data, and a version number of the data, and each of the second computers includes a cache that holds copy data of the data acquired from the persistent storage device. The method comprising by the second computer, transmitting, to the first computer, confirmation data including the identification information and the version number of the copy data updated in the cache of the own computer;

by the first computer, based on the confirmation data received from the second computer and information stored in the persistent storage device, extracting the identification information and the version number corresponding to the copy data to be written to the persistent storage device, from the confirmation data received from the second computer, and transmitting response data including the extracted identification information and the extracted version number to the second computer; and by the second computer, based on the response data received from the first computer and information stored in the cache, determining the copy data in the cache to be transmitted to the first computer to be written to the persistent storage device.

A computer system, according to a second exemplary aspect of the present disclosure, includes a first computer; and a plurality of second computers.

The first computer includes a persistent storage device that stores a set of data, identification information of the data, and a version number of the data; and a first controller, and each of the second computers includes a cache that holds copy data of the data acquired from the persistent storage device; and a second controller.

The second controller of the second computer transmits, to the first computer, confirmation data including the identification information and the version number of the copy data updated in the cache of the own computer.

Based on the confirmation data received from the second computer and information stored in the persistent storage device, the first controller of the first computer extracts the identification information and the version number corresponding to the copy data to be written to the persistent storage device, from the confirmation data received from the second computer, and transmits response data including the extracted identification information and the extracted version number to the second computer.

Based on the response data received from the first computer and information stored in the cache, the second controller of the second computer determines the copy data stored in the cache to be transmitted to the first computer so as to be written to the persistent storage device.

A storage computer, according to a third exemplary aspect of the present disclosure, is a storage computer connected with a plurality of cache computers, each having a cache, over a network. The storage computer includes a persistent storage device that stores a set of data, identification information of the data, and a version number of the data; and a controller.

From the cache computer holding, in the cache, copy data of the data stored in the persistent storage device, the controller receives confirmation data including the identification information and the version number of the copy data updated in the cache, based on the received confirmation data and information stored in the persistent storage device, extracts the identification information and the version number corresponding to the copy data to be written to the persistent storage device, from the confirmation data received from the cache computer, and transmits response data including the extracted identification information and the extracted version number to the cache computer.

A cache computer, according to a fifth exemplary aspect of the present disclosure, is a cache computer connected with a storage computer over a network. The storage computer includes a persistent storage device that stores a set of data, identification information of the data, and a version number of the data. The cache computer includes a cache that holds copy data of the data acquired from the persistent storage device; and a controller.

The controller transmits, to the storage computer, confirmation data including the identification information and the version number of the copy data updated in the cache, receives, from the storage computer, response data including the identification information and the version number corresponding to the copy data to be written to the persistent storage device, and based on the response data received from the first computer and information stored in the cache, determines the copy data in the cache to be transmitted to the storage computer so as to be written to the persistent storage device.

A program, according to a fifth exemplary aspect of the present disclosure, is a program for causing a storage computer to function as, the storage computer being connected with a plurality of cache computers, each having a cache, over a network:

a persistent storage device that stores a set of data, identification information of the data, and a version number of the data; and a controller.

From the cache computer holding, in the cache, copy data of the data stored in the persistent storage device, the controller receives confirmation data including the identification information and the version number of the copy data updated in the cache, based on the received confirmation data and information stored in the persistent storage device, extracts the identification information and the version number corresponding to the copy data to be written to the persistent storage device, from the confirmation data received from the cache computer, and transmits response data including the extracted identification information and the extracted version number to the cache computer.

A program, according to a sixth exemplary aspect of the present disclosure, is a program for causing a cache computer, connected with a storage computer, to function as, the storage computer including a persistent storage device that stores a set of data, identification information of the data, and a version number of the data:

a cache that holds copy data of the data acquired from the persistent storage device; and a controller.

The controller transmits, to the storage computer, confirmation data including the identification information and the version number of the copy data updated in the cache, receives, from the storage computer, response data including the identification information and the version number corresponding to the copy data to be written to the persistent storage device, and based on the response data received from the first computer and information stored in the cache, determines the copy data in the cache to be transmitted to the storage computer so as to be written to the persistent storage device.

(This paragraph is a rewarding of paragraph 0043)

BRIEF DESCRIPTION OF DRAWINGS

FIG. 7 is a diagram for explaining a configuration of cache data of FIG. 3 according to the second exemplary embodiment.

FIG. 10 is a diagram for explaining a persistence table held by a storage node according to the second exemplary embodiment.

DETAILED DESCRIPTION

As a technique for improving data processing capability in a distributed processing system such as a distributed KVS, use of a cache has been known. Use of a cache is a technique of storing frequently used data in a high-speed storage device to thereby realize high-speed processing by eliminating wasteful processing of reading every time from a low-speed persistent storage device In a system using a cache, multiple computers with cache will send multiple updates of a data to the low-speed persistent storage device. The low-speed persistent storage device stores newer update of the data received. In some case, older update of the data might be received after newer update of the data is received. Thus, even in a system using a cache, data not to be reflected on the persistent storage device is transmitted and received between the computers wastefully. As a result, transmission and reception of the updated data performed between the computers is useless.

Next, exemplary embodiments will be described in detail with reference to the drawings.

First Exemplary Embodiment

Figure 1:
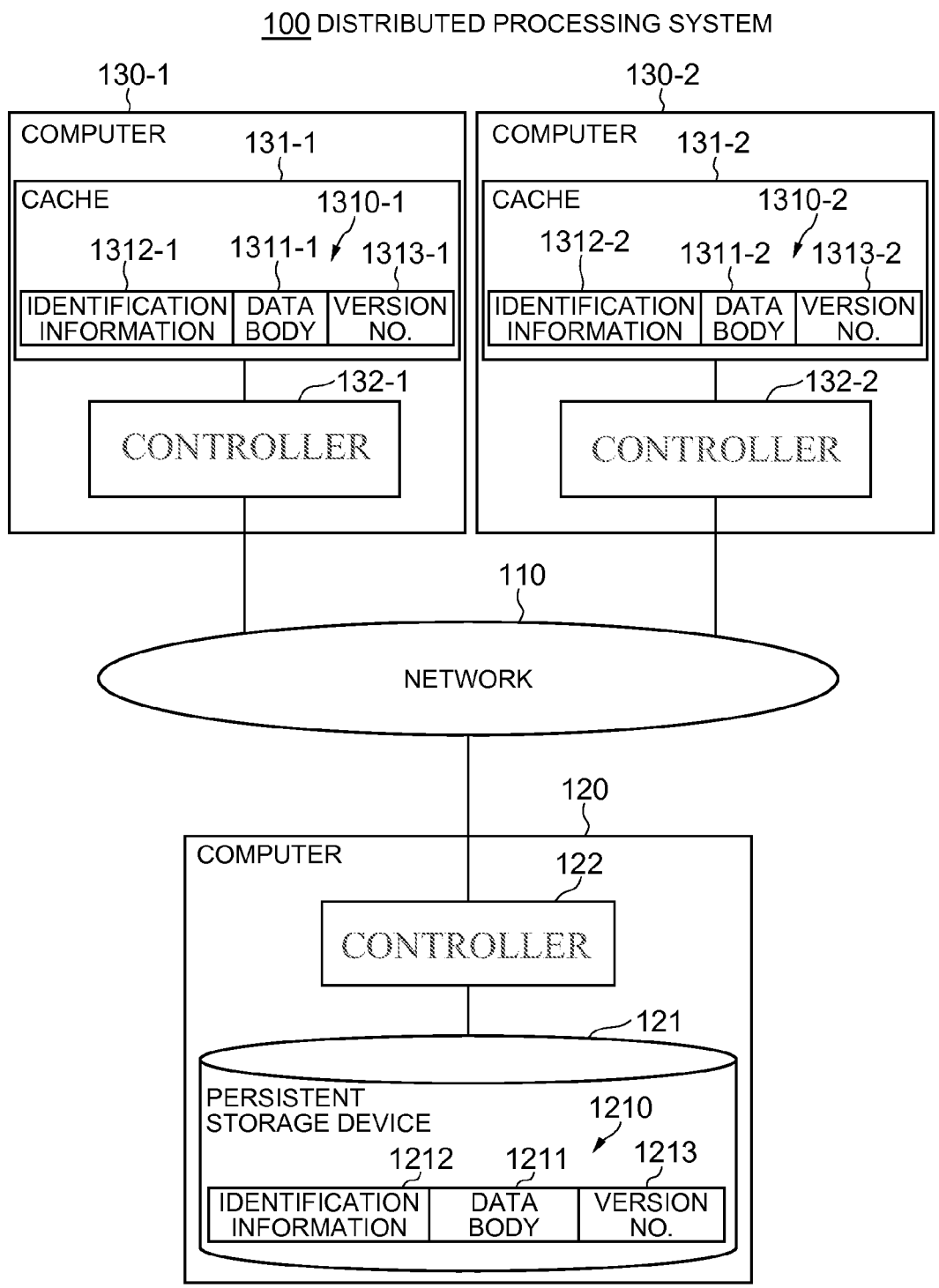
FIG. 1 is a block diagram of a distributed processing system according to a first exemplary embodiment.

Referring to FIG. 1, a distributed processing system 100 according to a first exemplary embodiment includes a computer 120, and a plurality of computers 130 connected with the computer 120 over a network 110.

The computer 120 is a computer such as a storage server (also referred to as a storage node) which stores data persistently. The computer 120 may be a dedicated or general-purpose computer including a CPU (Central Processing Unit), memories such as ROM (Read Only Memory), RAM, and the like, an external storage device which stores various types of information, an input/output interface, a communication interface, and a bus connecting them with each other. The number of the computers 120 may be plural.

The computer 120 includes a persistent storage device 121 and a controller 122 as main function units.

The persistent storage device 121 is configured of a hard disk, for example. The persistent storage device 121 persistently stores data 1210. The data 1210 includes a data body 1211, data identification information 1212, and a version number 1213. The data body 1211 includes numerical values and character strings. The data identification information 1212 is an identifier which uniquely identifies the data 1210. The version number 1213 shows the latest time when the data 1210 is updated. While the version number shows the update time in this example, the version number in the present invention may be one other than the update time if it determines the order among a plurality of events. For example, a vector clock in a distributed key value store (KVS) called Casandra may be used as the version number.

The controller 122 governs main control of the computer 120. The controller 122 can be realized by the CPU constituting the computer 120 and a program stored in the ROM or the like.

Each of the computers 130 is a computer such as a server which holds a copy of the data 1210 stored in the persistent storage device 121 of the computer 120, performs processing of referring to or updating the copy of the data 1210 in accordance with a processing request received from a client device not shown, and sends back a processing result to the client device. Each of the computers 130 may be a dedicated or a general purpose computer including a CPU, memories such as ROM, RAM, and the like, an external storage device which stores various types of information, an input/output interface, a communication interface, and a bus which connects them with each other. Further, while the number of computers 120 are two in FIG. 1, three or more computers 120 may be provided.

Each of the computers 130 includes a cache 131 and a controller 132.

The cache 131 has a function of holding copy data 1310 of the data 1210 acquired from the computer 120. The cache 131 is configured of a readable/writable memory such as RAM. The copy data 1310 in the cache 131 includes a data body 1311, identification information 1312, and a version number 1313 corresponding to the data body 1211, the identification information 1212, and the version number 1213 of the original data 1210.

The controller 132 governs main control of the computer 130. The controller 132 can be realized by the CPU constituting the computer 130 and a program stored in the ROM or the like.

The network 110 is a communication channel between the computer 120 and the computers 130.

Figure 2:
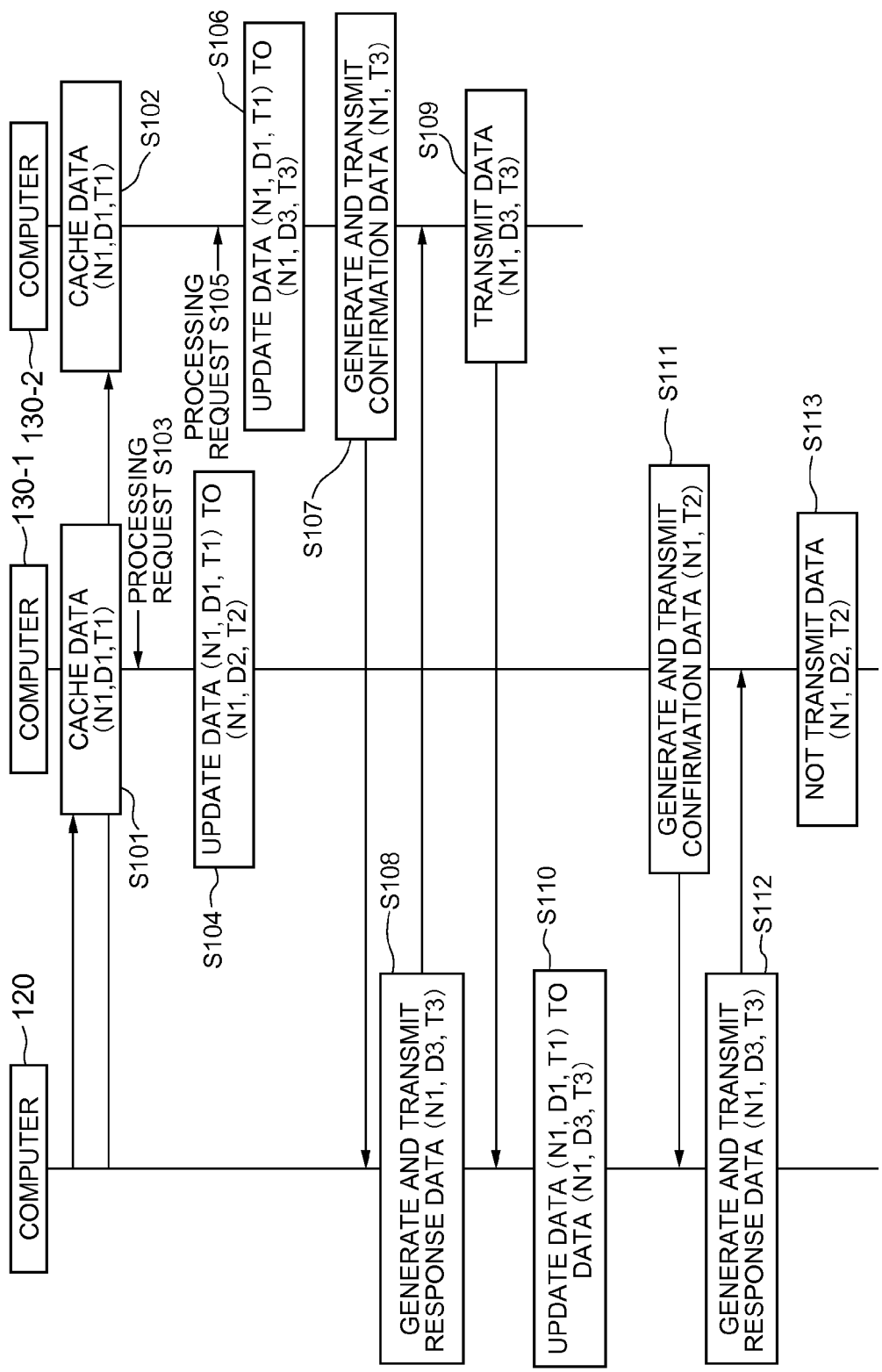
FIG. 2 is a sequence chart showing an exemplary operation of the distributed processing system of FIG. 1 according to the first exemplary embodiment.

FIG. 2 is a sequence chart showing an exemplary operation according to the present embodiment. Hereinafter, operation of the present embodiment will be described with reference to FIGS. 1 and 2.

The controller 132 of each computer 130 communicates with the controller 122 of the computer 120 to thereby acquire the frequently used data 1210 from the persistent storage device 121 of the computer 120 and copies it to the cache 131 (steps S101 and S102 in FIG. 2). Here, it is assumed that the data 1210 in which the data body 1211 is "D1", the identification information is "N1", and the version number is "T1", is copied to the cache 131 of each computer 130.

Then, the controller 132 of each computer 130 performs processing according to the processing request using the copy data 1310 in the cache 131. At this time, the controller 132 rewrites the version number 1313 based on the update time when updating the data body 1311 of the copy data 1310.

In the example shown in FIG. 2, one computer 130-1 rewrites the data body 1311-1 of the data 1310-1 in the cache 131-1 from "D1" to "D2", and rewrites the version number 1313-1 from "T1" to "T2", in accordance with a processing request S103 (S104). Further, at the time after the computer 130-1 updated the data 1310-1, the other computer 130-2 rewrites the data body 1311-2 of the data 1310-2 in the cache 131-2 from "D1" to "D3", and rewrites the version number 1313-2 from "T1" to "T3", in accordance with a processing request S105 (step S106).

In case of loss of cache data due to occurrence of a failure in the own computer 130, the controller 132 of each computer 130 allows the data 1310 updated in the cache 131 to be reflected on the persistent storage device 121 of the computer 120. At that time, the controller 132 does not transmit the copy data 1310 including the updated data body 1311 to the computer 120 abruptly. Instead, the controller 132 transmits confirmation data including the identification information 1312 and the version number 1313 in the copy data 1310 to the computer 120. The controller 132 of each computer 130 may transmit confirmation data to the computer 120 any time. For example, each computer 130 may periodically repeat an operation of reading the updated data 1310, in which confirmation data has not been transmitted to the computer 120, from the cache 131, and transmitting the confirmation data to the computer 120, for every period determined by the own computer 130.

In the example shown in FIG. 2, first, the computer 130-2, of the computers 130-1 and 130-2, generates confirmation data including the identification information "N1" and the version number "T3" of the updated data 1310-2, and transmits it to the computer 120 (step S107).

Upon receipt of the confirmation data from the computer 130-2, the controller 122 of the computer 120 generates response data and transmits it (step S108). When generating the response data, based on the received confirmation data and the information stored in the persistent storage device 121, the controller 122 first extracts the identification information and the version number corresponding to the copy data to be written to the persistent storage device 121, from the received confirmation data. In this example, as the version number "T3" paired with the identification information "N1" in the confirmation data is a later one than the version number "T1" of the data 1210 having the same identification information "N1" in the persistent storage device 121, the identification information "N1" and the version number "T3" are extracted from the confirmation data. Then, the controller 122 transmits response data including the extracted identification information "N1" and the version number "T3", to the computer 130-2. It should be noted that if no identification information corresponding to the copy data to be written to the persistent storage device 121 is extracted from the confirmation data, the controller 122 generates response data including the identification information in the confirmation data, and the version number of the data 1210 stored in the persistent storage device 121 in association with the identification information, and transmits it to the computer 130-2.

Upon receipt of the response data from the computer 120, based on the received response data and the information stored in the cache 131-2, the controller 132 of the computer 130-2 determines copy data in the cache 131-2 to be transmitted to the computer 120 for persistence, and transmits it (step S109). Specifically, for each unit of identification information included in the response data, the controller 132 extracts, from the cache 131, the version number 1313 of the copy data 1310 having the same identification information, and compares it with the version number paired with the identification information in the response data. Then, the controller 132 determines the copy data 1310, in which the version number extracted from the cache 131 is not older than the version number in the response data, to be the data to be transmitted to the computer 120 for persistence, and transmits it. In this example, as the version number "T3" of the copy data 1310-2 having the identification information "N1" in the cache 131-2 is not older than the version number "T3" paired with the identification information "N1" in the response data, it is determined to be data to be transmitted to the computer 120 by the copy data 1310-2 for persistence. Then, the controller 132 reads the determined copy data 1310-2 from the cache 131-2, and transmits it to the computer 120.

Upon receipt of the copy data 1310-2 from the computer 130-2, based on the received copy data and the information stored in the persistent storage device 121, the controller 122 of the computer 120 determines whether or not to write the received copy data to the persistent storage device 121, and when determining to write, writes it (step S110). Specifically, for each unit of received copy data, the controller 122 extracts the version number 1213 of the data 1210 having the same identification information from the persistent storage device 121, and compares it with the version number in the copy data. Then, the controller 122 determines copy data having the version number later than the version number in the persistent storage device 121 to be copy data to be written, and writes it to the persistent storage device 121. In this example, as the version number "T3" of the copy data 1310-2 received from the computer 130-2 is later than the version number "T1" of the data 1210 in the persistent storage device 121, the data 1210 in the persistent storage device 121 is rewritten to the copy data 1310-2.

Then, in the example shown in FIG. 2, the computer 130-1 transmits confirmation data including the identification information "N1" and the version number "T2" of the updated data 1310-1, to the computer 120 (step S111).

Upon receipt of the confirmation data from the computer 130-1, the controller 122 of the computer 120 generates response data and transmits it (step S112). In this example, the version number "T2" of the data 1310-1 specified by the identification information "N1" in the confirmation data is not later than the version number "T3" of the data 1210 having the same identification information "N1" in the persistent storage device 121. As such, the controller 122 generates response data including the identification information "N1" in the confirmation data and the version number "T3" of the data 1210 stored in the persistent storage device 121 in association with the identification information, and transmits it to the computer 130-1.

Upon receipt of the response data from the computer 120, based on the received response data and the information stored in the cache 131-1, the controller 132 of the computer 130-1 determines copy data in the cache 131-1 to be transmitted to the computer 120 for persistence (step S113). In this example, the version number "T2" of the copy data 1310-1 having the identification information "N1" in the cache 131-1 is not later than the version number "T3" paired with the identification information "N1" in the response data. As such, the controller 132 determines not to transmit the copy data 1310-1 to the computer 120. In this case, the controller 132 may communicate with the controller 122 of the computer 120 to acquire the latest data 1210 of the identification information "N1" and copy it to the cache 131-1.

As described above, according to the present embodiment, it is possible to prevent data not to be reflected on the persistent storage device from being transmitted and received wastefully between the computers. This is because each of the computers 130 does not transmit data updated in the cache to the computer 120 abruptly, but exchanges confirmation data and response data with the computer 120 to thereby determine data to be transmitted to the computer 120.

Further, according to the present embodiment, it is possible to prevent network congestion between the computer 120 and the computers 130, to thereby prevent deterioration in throughput and response time for persistence of cache data. This is because as the size of the identification information and the version number of data is relatively smaller than that of the data body, the amount of transmission and reception reduced by the reduction of wasteful transmission and reception of data including the data body is larger than the amount of transmission and reception increased by the exchange of confirmation data and response data.

Second Exemplary Embodiment

Next, a second exemplary embodiment will be described. The present embodiment relates to a system for making cache data persistent (hereinafter referred to as a cache persistence system) by a plurality of server computers (hereinafter referred to as cache nodes), each of which holds cache data on memory, in a remote server computer (hereinafter referred to as a storage node) equipped with a hard disk, over a communication network. Hereinafter, description will be given on a distributed cache persistence system which is a premise of the present embodiment and the problems thereof, outline of the present embodiment, effects of the present embodiment, configuration of the the present embodiment, operation of the present embodiment, and examples, in this order.

<Distributed Cache Persistence System Which is a Premise of the Present Embodiment and the Problems Thereof>

A cache data persistence function is an indispensable function of a database server, an application server, a web server, and the like. With respect to a data request (reference, update, addition, deletion, and the like of data) received from an application, these servers send back appropriate data (response data) to the application.

When generating response data to be sent back to an application, if accessing is made sequentially to data stored in a storage (built-in hard disk in the server or the like), there is a problem of a low response speed due to frequent occurrence of disk IO. In order to solve this problem, a cache memory is used. As a cache memory enables data accessing to be performed at a higher speed compared with the case of a storage, by temporarily saving data of high access frequency in a cache memory and acquiring data by an application not from a storage but from the cache memory, the number of disk IO is reduced, whereby the response speed becomes higher.

The cache data persistence function is a function of allowing cache data in a cache memory to be reflected in a storage on a regular basis. The grounds that this function exists are as described below. In general, when a server machine configured of a volatile memory goes down, cache data temporarily saved in the cache memory is lost. As a result, a data update history applied to the cache data by the application is lost. As such, it is to make the cache data in the cache memory to be reflected (persistent) in the storage. Such a function is provided by a cache data persistence system.

In recent years, as the amount of data stored in a database becomes larger, a database configured by clustering a large number of (several hundreds to several thousands) servers (distributed database) attracts attention. In a distributed database, different functions are assigned to respective servers for the purpose of load distribution (the amount of data to be stored, the number of data processing requests to be processed, and the like per one server), and according to cooperative operation by those servers, functions same as those of a typical database other than a distributed database are provided to an application.

Figure 3:
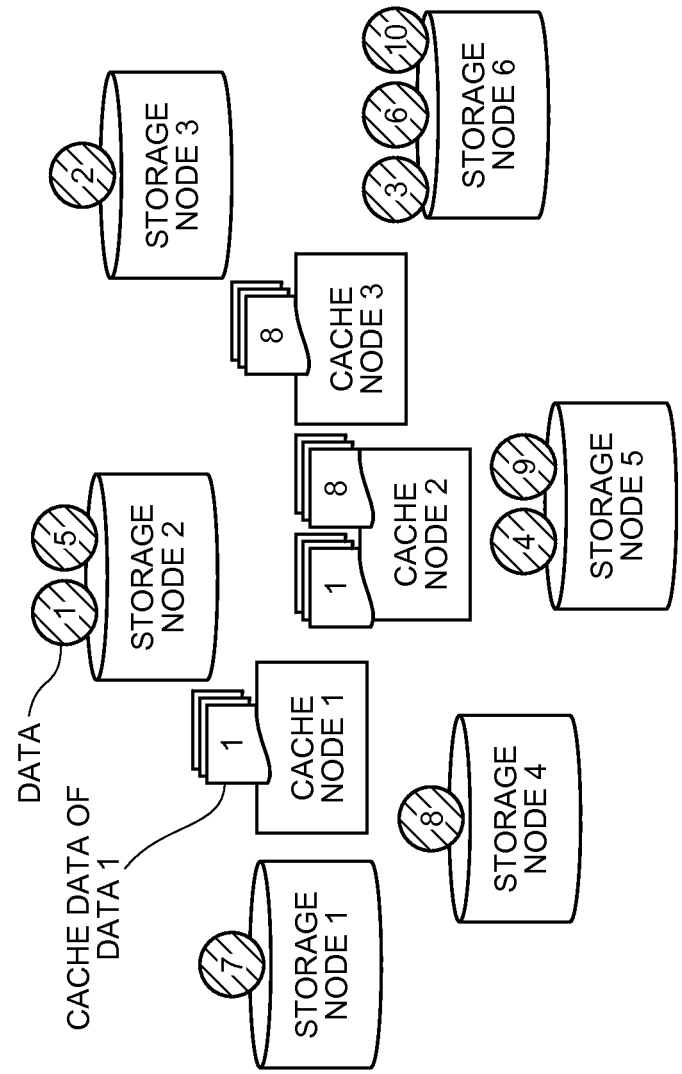
FIG. 3 is a diagram for explaining a distributed cache data persistence system which is a premise of a second exemplary embodiment.

A cache data persistence system used in a distributed database is called a distributed cache data persistence system. As shown in FIG. 3, a distributed cache data persistence system includes a plurality of cache nodes 1, 2, and 3, and a plurality of storage nodes 1, 2, 3, 4, 5, and 6. As it is possible that a cache node and a storage node are provided in one physical server, they are generally constructed in different physical servers from the viewpoint of load distribution.

A cache node acquires data of high access frequency as cache data from a storage node in advance by using statistical information (for example, an access frequency measurement value at a table level of a database) of data requests from an application, and cache it in the own memory. As an application is connectable to an arbitrary cache node, cache data 1 stored in the storage node 4 may be cached in the cache node 1 and the cache node 2. The cache data 1, cached in the cache node 1 and the cache node 2, is transmitted to the storage node 4 on a regular basis.

Figure 4:
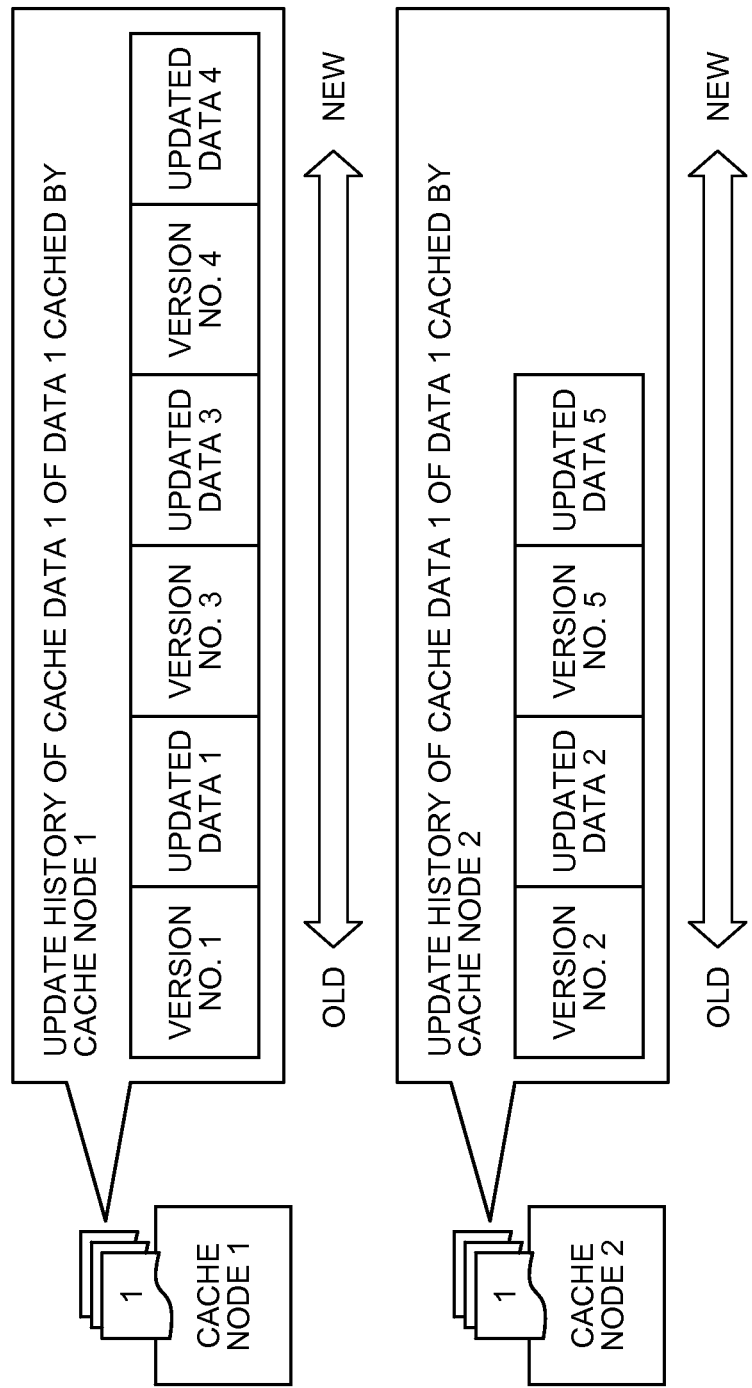
FIG. 4 is a diagram for explaining a configuration of cache data of the distributed cache data persistence system which is a premise of the second exemplary embodiment.

The storage node 4 refers to the update history described in the received cache data 1, to thereby update the data corresponding to the cache data 1 stored therein appropriately. Specifically, as shown in FIG. 4, in the cache data 1 cached by the cache node 1, the update history performed in the cache node 1 is described along with the version number. Similarly, in the cache data 1 cached by the cache node 2, the update history performed in the cache node 2 is described along with the version number. The storage node 4 compares the cache data 1 (update history) of the cache node 1 with the cache data 1 (update history) of the cache node 2, and updates the data 1 stored therein with use of the updated data 5 of the latest version number 5 described in the cache data 1 of the cache node 2, and makes it persistent.

In the distributed cache data persistence system described above, there is a problem that when the number of cache nodes in which the same cache data is saved is increased, network congestion occurs, whereby the cache data persistence performance (throughput, response time, and the like) deteriorates. This is because as the cache nodes holding the same cache data do not share information about the update histories of the cache data held by them, the cache nodes transmit the cache data update histories entirely to the storage node.

In view of the above, the present embodiment provides a distributed cache data persistence system capable of preventing deterioration in the cache data persistence performance due to network congestion.

<Outline of the Present Embodiment>

Figure 5:
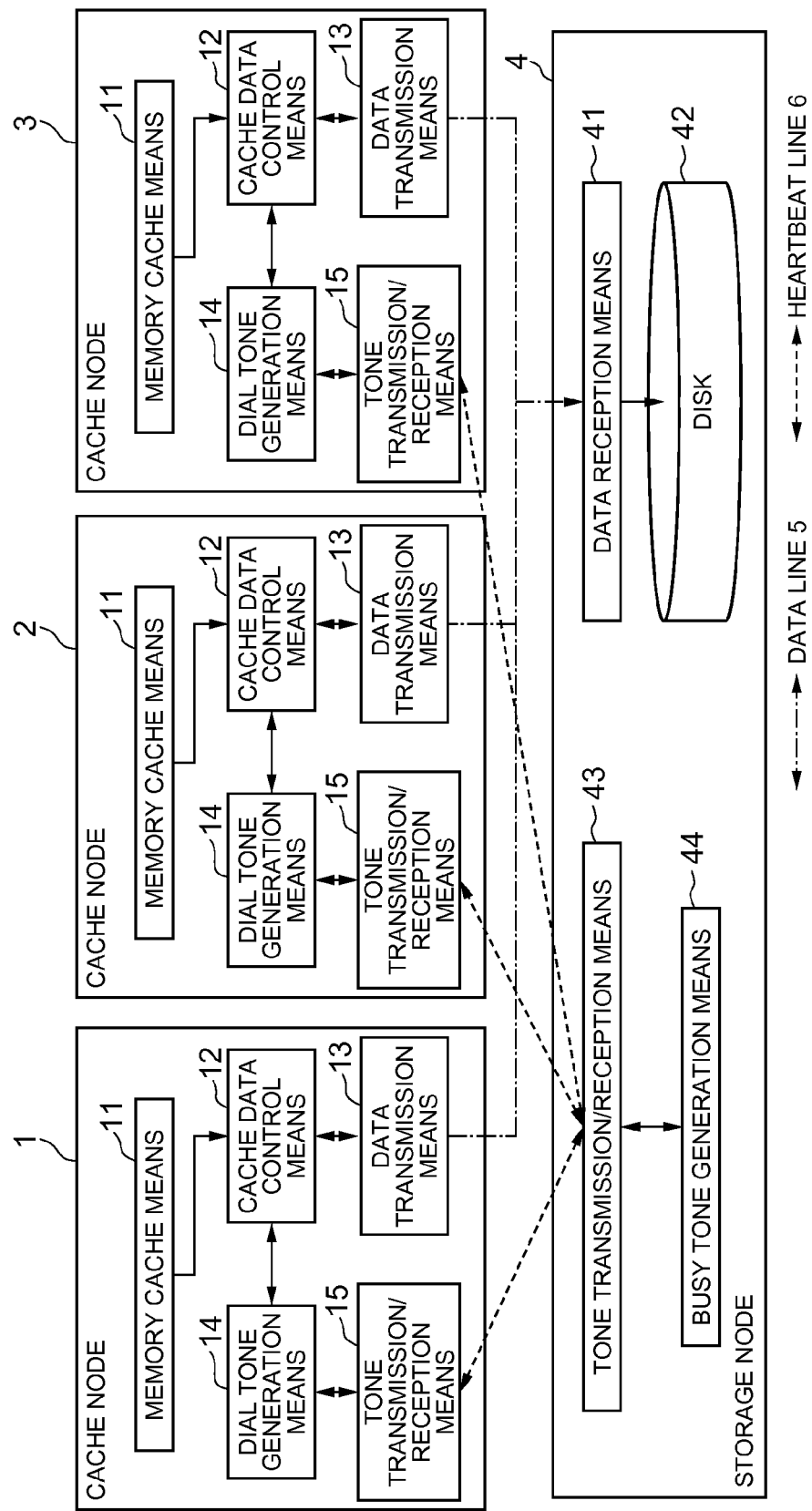
FIG. 5 is a block diagram of a distributed processing system according to the second exemplary embodiment.

As shown in FIG. 5, the cache node 1 of the distributed cache data persistence system of the present embodiment includes a dial tone generation means 14 for generating a confirmation signal (hereinafter referred to as a dial tone) for notifying the storage node 4 of a cache data transmission request. The storage node 4 includes a busy tone generation means 44 for generating a response signal (hereinafter referred to as a busy tone) for notifying the cache node 1 of cache data transmission permission. The cache node 1 and the storage node 4 include a tone transmission/reception means 15 and a tone transmission/reception means 43, respectively, for exchanging a dial tone and a busy tone using a data line (hereinafter referred to as a heartbeat line) 6 which is an independent line other than a data line 5 used for transmission of cache data. The cache node 1 includes a cache data control means 12 for analyzing a busy tone received from the storage node 4, and selecting cache data to be transmitted to the storage node 4. In the distributed cache data persistence system of the present embodiment, there may be other cache nodes and storage nodes having the same means as those of the cache node 1 and the storage node 4.

<Effects of the Present Embodiment>

By adopting such a configuration and adjusting, in advance, cache data to be transmitted between the cache nodes and the storage node before transmission of the cache data, the entire amount of the actually transmitted cache data can be reduced. Thereby, the problem described above can be solved.

Further, by only exchanging dial tones and busy tones for adjusting, in advance, cache data to be transmitted between a plurality of cache nodes and a plurality of storage nodes with use of the heartbeat line independent from the data line in advance, it is possible to make the cache data persistent while preventing deterioration in the cache data persistence performance due to network congestion in the data line used for transmission of the cache data.

This is because a plurality of cache nodes are prevented from making the cache data persistent in a redundant manner, and only minimum cache data is transmitted from cache nodes to a storage node.

<Configuration of the Present Embodiment>

Referring to FIG. 5, the present embodiment includes the cache nodes 1, 2, and 3 and the storage node 4, each of which can be realized by a computer, a workstation, or the like having a data processing function, a data communication function, a data storage function, and the like realized by program control. While FIG. 5 shows a configuration only including three cache nodes and one storage node, a larger number of cache nodes and storage nodes having the same means may be included.

The cache nodes 1, 2, and 3 and the storage node 4 are communicable with each other using the data line 5 and the heartbeat line 6. The data line 5 and the heartbeat line 6 are networks which are independent from each other, and even if the data line 5 is disconnected, the cache nodes and the storage node are communicable with each other using the heartbeat line 6. The cache nodes 1, 2, and 3 transmit cache data to the storage node 4 using the data line 5. The cache node 1, 2, and 3 and the storage node 4 transmit tones (dial tones, busy tones) using the heartbeat line 6 for prior adjustment of cache data to be transmitted.

Each of the cache nodes 1, 2, and 3 includes a memory cache means 11, the cache data control means 12, a data transmission means 13, the dial tone generation means 14, and the tone transmission/reception means 15.

The storage node 4 includes a data reception means 41, a disk 42, the tone transmission/reception means 43, and the busy tone generation means 44.

The memory cache means 11 of the cache nodes 1, 2, and 3 temporarily stores data of high access frequency in the cache memory. The cache data control means 12 acquires data from the memory cache means 11 on a regular basis, and transmits it from the data transmission means 13 to the data reception means 41 of the storage node 4 with use of the data line 5. The data reception means 41 writes the received cache data on the disk 42 and makes it persistent.

The dial tone generation means 14 of the cache nodes 1, 2, and 3 generates a dial tone showing a transmission request of cache data, before transmission of the cache data. The tone transmission/reception means 15 transmits the generated dial tone to the tone transmission/reception means 43 of the storage node 4 with use of the heartbeat line 6. The dial tone describes history information regarding the cache data to be transmitted by the cache node.

The busy tone generation means 44 of the storage node 4 generates a busy tone corresponding to the dial tones received by the tone transmission/reception means 43 from the cache nodes 1, 2, and 3. The tone transmission/reception means 43 transmits the generated busy tone to the tone transmission/reception means 15 of the cache nodes 1, 2, and 3. Specifically, the storage node 4 analyzes the dial tones received from the cache nodes, and in the case where a plurality of cache nodes attempt to transmit overlapped cache data, transmits a busy tone designating a cache node which transmits the cache data, to the cache nodes.

The cache data control means 12 of the cache nodes 1, 2, and 3 selects cache data to be transmitted to the storage node 4, according to the busy tone received by the tone transmission/reception means 15. Specifically, the cache data control means 12 transmits cache data to the storage node 4 by the data transmission means 13 only when it holds update data of the version number which is the same or later than the version number of the cache data described in the busy tone.

<Operation of the Present Embodiment>

Figure 6:
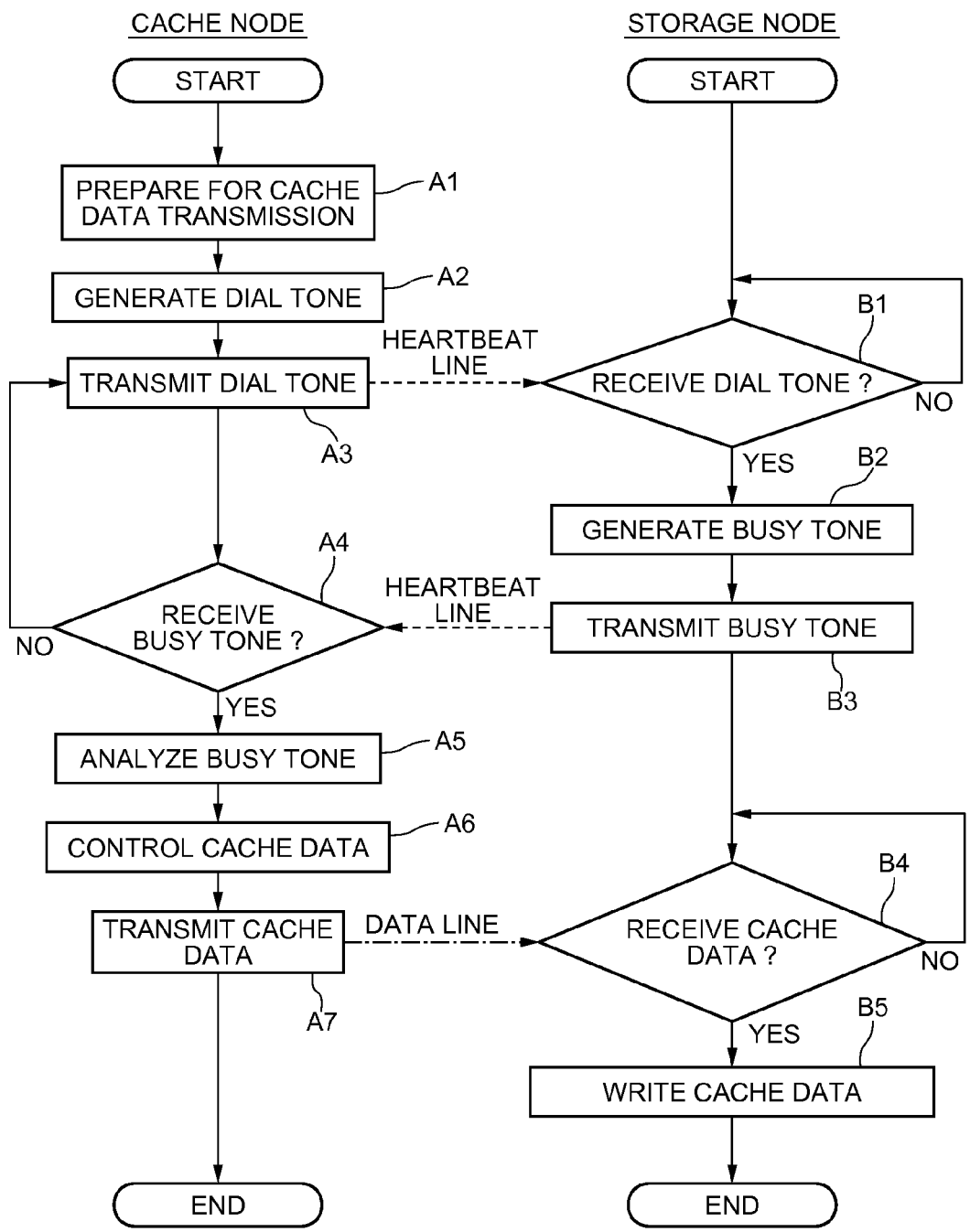
FIG. 6 is a flowchart showing an operation of the second exemplary embodiment of FIG. 5.

Next, operation of the the present embodiment will be described with reference to FIGS. 5 and 6.

Each of the cache nodes 1, 2, and 3 extracts cache data temporarily saved in the memory from the memory on a regular basis, according to the timing of each of the cache nodes, and starts preparation for transmission of cache data (step A1). Before actual transmission of cache data, in order to determine cache data to be transmitted, each cache node generates a dial tone from the update history of the extracted cache data (step A2). The cache node transmits the generated dial tone to the target storage node which makes the cache data extracted at step A1 persistent, via the heartbeat line 6 (step A3).

The storage node 4 waits for receipt of the dial tones from the cache nodes 1, 2, and 3 for a certain period (step B1). Then, with reference to the dial tones from the cache nodes 1, 2, and 3 received within a certain period, the storage node 4 specifies the latest updated data for each unit of the cache data. Then, the storage node 4 generates a busy tone describing the cache node holding the latest updated data for each unit of the cache data (step S2). Then, the storage node 4 transmits the generated busy tones to the cache nodes 1, 2, and 3 (step B3).

The cache nodes 1, 2, and 3 refer to the busy tones received from the storage node 4, and specify the cache data to be transmitted by the own (steps A4, A5). Then, the cache nodes 1, 2, and 3 transmits only cache data specified to be transmitted by the own, to the storage node 4 (step A6 and A7).

The storage node 4 writes the received cache data to the own disk 42 (steps B4 and B5).

As described above, in the present embodiment, dial tones and busy tones are exchanged between the cache nodes and the storage node with use of the heartbeat line independent from the data line to thereby previously adjust cache data to be made persistent. As such, it is possible to transmit only minimum cache data with use of the data line, whereby deterioration in the cache data persistence performance due to network congestion can be prevented.

EXAMPLES

Next, examples of the second exemplary embodiment will be described with reference to the drawings.

The physical configuration of a system implementing the present embodiment will be described. Each of the distributed data cache nodes 1, 2, and 3 and the storage node 4 is realized by a computer, a workstation, a database, or the like equipped with a data processing unit such as a CPU, a data communication unit supporting the Ethernet, a wireless LAN, a dedicated communication network, and the like, data storage units such as RAM, ROM, HDD, and the like.

FIG. 7 shows an exemplary list of cache data held in the memories of the cache nodes 1, 2, and 3 at a given time. As shown in FIG. 7, a unique identifier (cache data ID) is given to cache data. For example, in a cache data persistence system of a relational database, as a cache data ID, a unique identifier is used for a record of each table such as a primary key of the record. In the case of a distributed key value store, a key may be used as a cache data ID.

Further, to the cache data, the version number of data and update data are added as history data every time update is performed. Specifically, at the time of the $k^{th}$ update of cache data (cache data ID) "y" of a cache node "x", a version number $Tx\_y\_k$ and updated data $Dx\_y\_k$ are added.

The units of cache data 1, 2 and 3, described in FIG. 7, are assumed to be cache data to be made persistent in the storage node 4.

A case where the cache node 1 makes cache data persistent in the storage node 4 is assumed.

The cache node 1 determines cache data to be transmitted to the storage node 4. For example, there is a method of determining cache data in which the number of additions of the update history (update history length) exceeds a certain threshold, to be cache data to be transmitted. In this example, it is assumed that every cache data 1, 2, and 3 described in FIG. 7 is transmitted.

The cache node 1 generates a dial tone and transmits it to the storage node 4, before actually transmitting the latest updated data (D1_1_4 in the case of cache data 1) of the cache data 1, 2, and 3 to the storage node 4.

Figure 8:
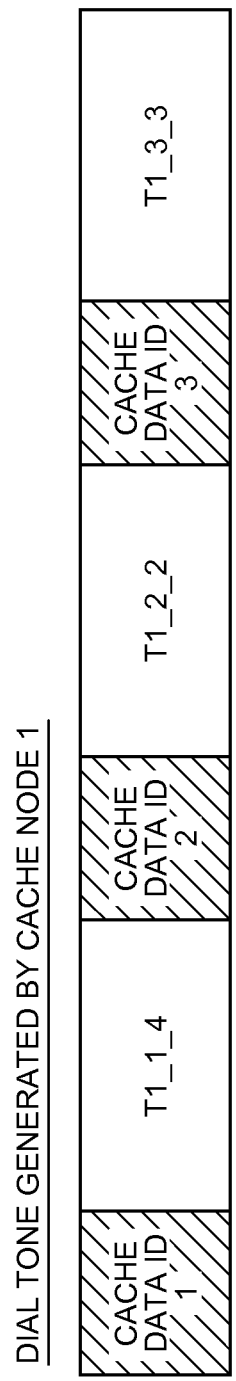
FIG. 8 is a diagram for explaining an exemplary dial tone transmitted by a cache node according to the second exemplary embodiment.

The cache node 1 sets, in the dial tone, ID and the latest version number of cache data to be made persistent. Specifically, the cache node 1 generates a dial tone (communication packet) shown in FIG. 8, and transmits it to the storage node 4 via the heartbeat line 6.

A case where cache node 2 transmits a dial tone to the storage node 4, at the same time as transmission of the dial tone by the cache node 1, is assumed.

Figure 9:
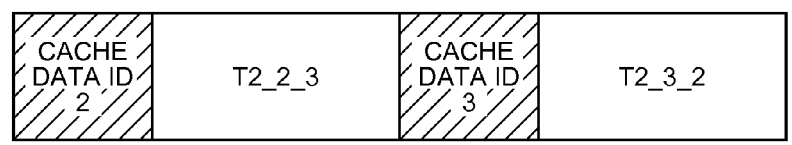
FIG. 9 is a diagram for explaining another exemplary dial tone transmitted by a cache node according to the second exemplary embodiment.

Similar to the dial tone of the cache node 1, the cache node 2 sets, in the dial tone, ID and the latest version number of cache data to be made persistent. Specifically, the cache node 2 generates a dial tone (communication packet) shown in FIG. 9, and transmits it to the storage node 4 via the heartbeat line 6.

Upon receipt of the dial tones from the cache nodes 1 and 2, the storage node 4 checks whether or not the cache data described in the dial tones have been made persistent (stored) therein. Specifically, when checking, the storage node 4 uses a persistence table which is a list of cache data and version number of cache data having been made persistent in the own node.

FIG. 10 is an exemplary configuration of a persistence table. In general, as the storage node 4 does not have update history of cache data unlike the cache nodes 1, 2, and 3, cache data (cache data ID) "y" made persistent in the storage node "x" is represented as version number Tx_y and updated data Dx_y. The cell representing NULL in the persistence table shows that the corresponding cache data (cache data 1 in the case of FIG. 10) has not been made persistent.

The storage node 4 determines, for each unit of cache data, which unit of cache data is the latest, from the busy tones received from the cache nodes 1 and 2 and the persistence table generated by itself.

In general, servers (cache nodes, storage nodes, and the like) operating on a distributed cache data persistence system are applied with time synchronization by the NTP (Network Time Protocol) via the heartbeat line 6, it is possible to determine old or new of the data using the version number.

Regarding the cache data 2, in the case where the version number in the cache node 1 is T1_2_2, the version number in the cache node 2 is T2_2_3, and the version number in the storage node 4 is T4_2, as a result of comparing them to determine old or new, if the version number T2_2_3 in the cache node 2 is the latest, the cache data D2_2_3 corresponding to the version number T2_2_3, existing in the memory of the cache node 2, should be reflected on the storage node 4 (FIG. 7).

Regarding the cache data 1, as there is no cache data 1 in the dial tone of the cache node 2 and in the persistence table of the storage node 4, the cache data D1_1_4 corresponding to the version number T1_1_4, existing in the memory of the cache node 1, should be reflected on the storage node 4.

Regarding the cache data 3, it is assumed that the data D4_3 corresponding to the version number T4_3 described in the persistence table of the storage node 4 is the latest. This case shows that a cache node other than the cache nodes 1 and 2 has already made the cache data 3 persistent in which the update time is the latest compared with the cache data 3 existing in the memories of the cache nodes 1 and 2.

Figure 11:
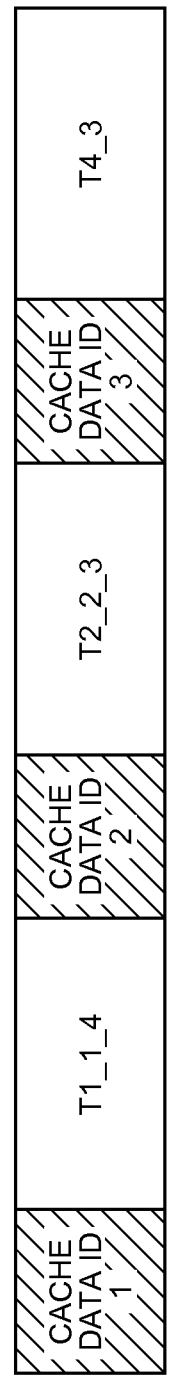
FIG. 11 is a diagram for explaining a busy tone transmitted by a storage node according to the second exemplary embodiment.

In such a situation, the storage node 4 generates a busy tone as shown in FIG. 11, and transmits it to the cache nodes 1, 2, and 3 via the heartbeat line 6.

As shown in FIG. 11, the busy tone describes the version number based on which it is determined to be the latest, for each unit of cache data.

Upon receipt of the busy tone from the storage node 4, the cache nodes 1, 2, and 3, analyze the busy tone and finally determine the cache data to be made persistent in the storage node 4 by itself.

The cache node 1 transmits only updated data D1_1_4 corresponding to the version number T1_1_4 designated for the cache data 1, to the storage node 4 via the data line 5. However, if it holds the cache data 1 which is the later one compared with the version number T1_1_4 in the update history, the cache node 1 transmits the latest cache data 1 to the storage node 4 via the data line 5. The cases of the cache data 2 and 3 are also the same. Compared with the version number T2_2_3 of the cache data 2 and the version number T4_3 of the cache data 3 described in the busy tone, if the same or later cache data 2 and cache data 3 are held, the cache data 2 and cache data 3, which are later than the one held by it, are transmitted to the storage node 4 via the data line 5. Similar to the cache node 1, the cache node 2 also finally determines cache data to be transmitted, and if there is cache data to be transmitted, transmits it to the storage node 4 via the data line 5.

On the other hand, the cache node 3, which did not transmit a dial tone, compares the version number T3_1_1 (FIG. 7) of the cache data 1, existing on the own memory, with the version number T1_1_4 of the cache data 1 described in the busy tone, and if the cache data 1 held by it is the latest one, transmits the cache data to the storage node 4 via the data line 5.

Upon receipt of the cache data (including the version number of the cache data) sent back from the cache nodes after transmission of the busy tone, the storage node 4 rewrites and updates the cache data to the received cache data (including the version number of the cache data) only when it is later one than the version number of the cache data which has been made persistent by the own. Then, the storage node 4 updates the persistence table.

In the exemplary embodiment described above, while the heartbeat line 6 for transmitting dial tones and busy tones and the data line 5 for transmitting cache data which is real data are networks independent from each other, the same network may be used if it is a network capable of securing a sufficient communication band.

Further, while the storage node 4 broadcasts a busy tone to the entire cache nodes 1, 2, and 3 including the cache node 3 which did not transmit a dial tone, the storage node 4 may send back a busy tone only to the cache nodes 1 and 2 which transmitted dial tones.

Further, in the dial tone and the busy tone, only metadata (cache data ID, version number, and the like) of the cache data is described and cache data which is actual data is not described, in order to reduce communication traffic of the heartbeat line by minimizing the packet size of the dial tone and the busy tone. However, in the case where the cache data, which is actual data, is smaller than a threshold, it is also possible to describe the cache data in the dial tone beforehand, and transmit it.

Third Exemplary Embodiment

Next, a third exemplary embodiment will be described in detail with reference to the drawings.

Figure 12:
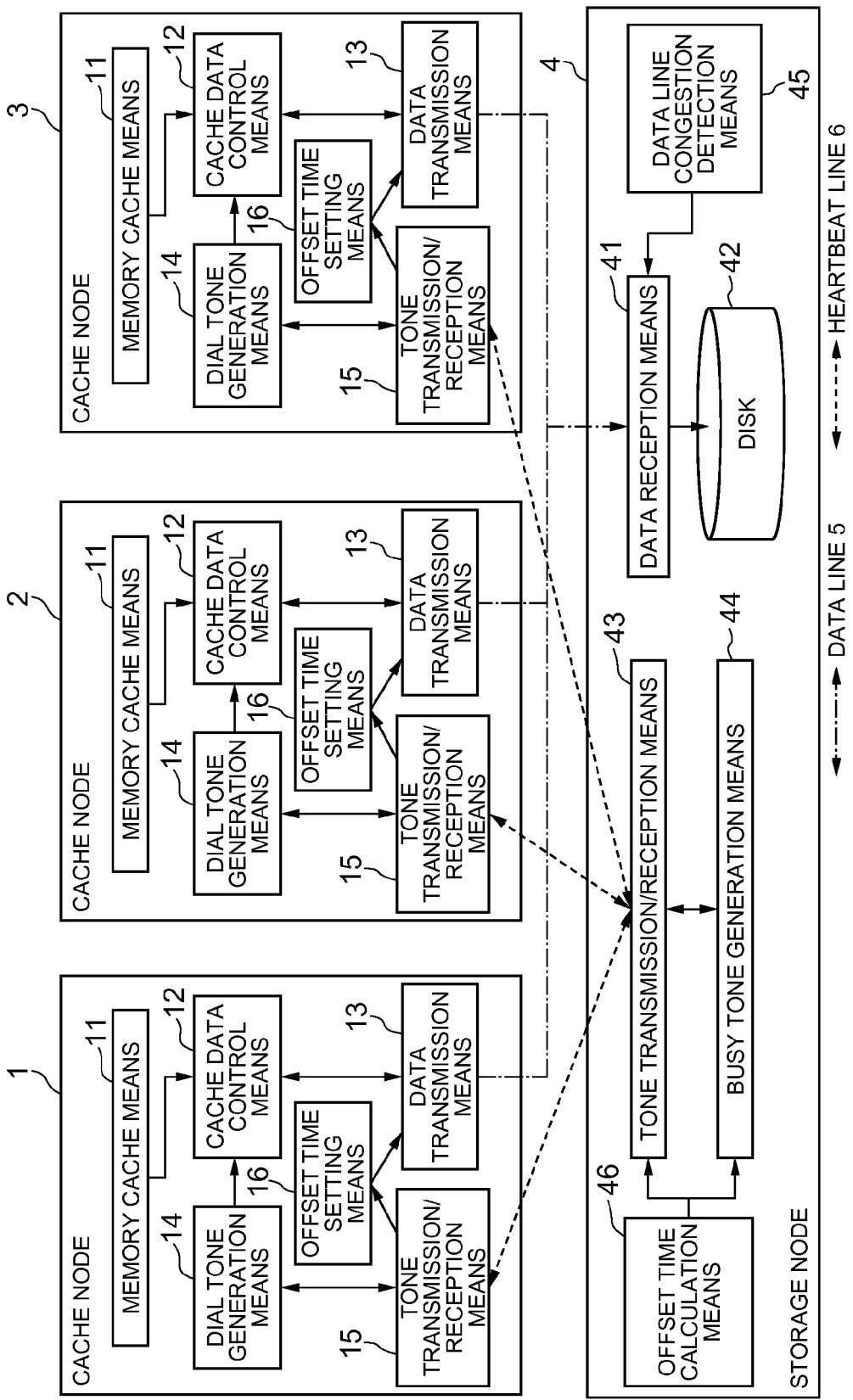
FIG. 12 is a block diagram of a third exemplary embodiment.

Referring to FIG. 12, the present embodiment is different from the second exemplary embodiment shown in FIG. 5 in that each of the cache nodes 1, 2, and 3 includes an offset time setting means 16 and that the storage node 4 includes a data line congestion detection means 45 and an offset time calculation means 46.

The data line congestion detection means 45 monitors the data reception means 41, and detects a network congestion which occurs when cache nodes make a large amount of cache data persistent in (transmit to) the same storage node.

The offset time calculation means 46 determines priority of persistence of cache data, calculates a persistence cycle (offset time) for each unit of cache data, and describes the offset tine in a busy tone.

The offset time setting means 16 analyzes the offset time described in a busy tone, and sets the persistence cycle of cache data in the data transmission means 13.

Figure 13:
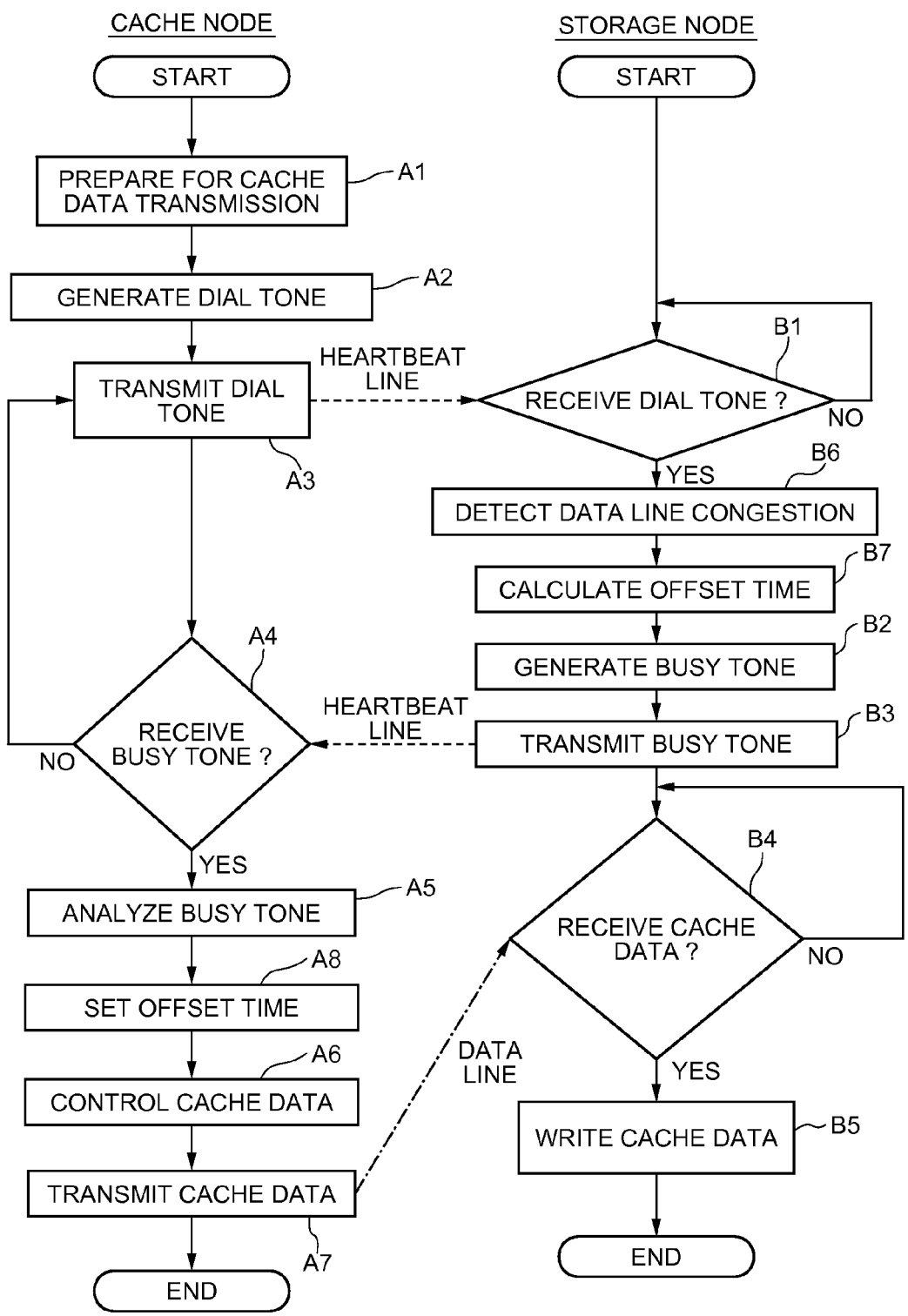
FIG. 13 is a flowchart showing an operation of the third exemplary embodiment.

Next, with reference to FIGS. 12 and 13, operation of the the present embodiment will be described in detail. It should be noted that as operations at steps A1, A2, A3, A4, A5, A6, and A7 and B1, B2, B3, B4, and B5 in FIG. 13 are the same as the operations of the second exemplary embodiment, description thereof is omitted.

In the second exemplary embodiment, the respective cache nodes transmit cache data to the storage node for persistence at the same time, that is, at a time when receiving a busy tone. Meanwhile, in the present embodiment, the storage node 4 checks the congestion of the data line 5 (step B6) after receiving dial tones at step B1, and if congestion occurs, calculates an offset time for each unit of cache data (step B7), and generates a busy tone describing the offset time (step B2). On the other hand, the cache nodes 1, 2, and 3 analyze the busy tone received at step A5, and extracts the offset time for each unit of cache data (step A8), and transmits the cache data corresponding to the offset time in a cycle corresponding to the offset time (step A6 and A7). This means that cache data is transmitted at a time when the offset time has elapsed from the time when the busy tone is received.

Next, effects of the present embodiment will be described.

In the present embodiment, as a cache data transmission cycle is set to the offset time, it is possible to prevent congestion in the data line which occurs due to concentration of cache data transmission traffic from the cache nodes to a storage node in a short period. As such, as the number of times of retransmission of the cache data due to packet loss caused by congestion is reduced, deterioration in the cache data persistence performance can be prevented.

Hereinafter, an example of the third exemplary embodiment will be described.

While the present example has the same configuration as that of the example of the second exemplary embodiment, the present example differs from the example of the second exemplary embodiment in that each of the cache nodes 1, 2, and 3 also functions as the offset time setting means 16. Further, the aspect that the storage node 4 also functions as the data line congestion detection means 45 and the offset time calculation means 46 differs from the example of the second exemplary embodiment.

A method of calculating an offset time which is a cache data transmission cycle for each unit of cache data by the data line congestion detection means 45 and the offset time calculation means 46 of the storage node 4 will be described.

The storage node 4 monitors the own network interface, measures network parameters (packet loss rate, delay time, and the like), and determines that network congestion occurs when the measurement values exceed predetermined network parameters. As a method of detecting network congestion, a detection method other than the detection method based on the network parameters described in the present example may be used.

When the storage node 4 detects congestion in the data line, the storage node 4 calculates an offset time for each unit of cache data described in the received dial tone.

The present example assumes a case where a busy tone sent back to the cache nodes is the one as shown in FIG. 11. In this case, the respective version numbers T1_1_4, T2_2_3, and T4_3 of the cache data 1, 2, and 3 are referred to, cache data having the oldest version number (updated time is the oldest) is specified and is compared with other units of cache data, and an "offset time of a small value (cache data transmission frequency is high)" is set in the cache data. While the present example has described the offset time calculation method of calculating an offset time by only referring to the version numbers described in the dial tones (FIG. 8 and FIG. 9) and the persistence table (FIG. 10), it is possible to use a calculation method of setting an "offset time of a large value (low cache data transmission frequency)" to large-sized cache data by describing the size of the cache data in the dial tones, for example.

Figure 14:
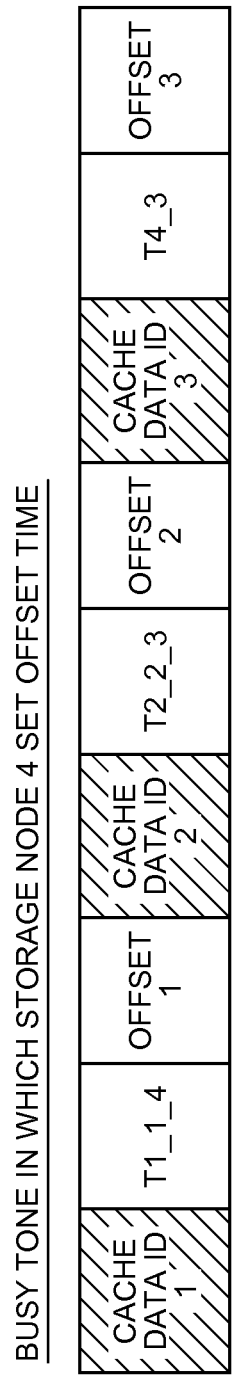
FIG. 14 is a diagram for explaining a busy tone transmitted by a storage node according to the third exemplary embodiment.

As shown in FIG. 14, the storage node 4 sends back, to the cache nodes, a busy tone in which offset times OFFSET 1, OFFSET 2, and OFFSET 3 calculated with respect to the respective units of cache data 1, 2, and 3 are set.

The offset time setting means 16 of the cache nodes 1, 2, and 3 analyzes the busy tone received from the storage node 4, and if there is cache data to be transmitted by itself, the offset time setting means 16 makes the cache data persistent in (transmits to) the storage node 4 in offset time cycle corresponding to the cache data.

While the present invention has been described with reference to some exemplary embodiments and examples, the present invention is not limited to the examples described above, and various additions and changes can be made therein. For example, in the third exemplary embodiment, when congestion in the data line is detected, an offset time for each unit of cache data described in the received dial tone is calculated and set in the busy tone. However, as another exemplary embodiment, it is possible to calculate an offset time for each unit of cache data described in the received dial tone and set it in the busy tone, regardless of presence or absence of congestion in the data line.

The invention claimed is:

1. A method of controlling data writing to a persistent storage device in a computer system, the computer system including a first computer and a plurality of second computers, the first computer including a persistent storage device that stores a set of data, identification information of the data, and a version number of the data, each of the second computers including a cache that holds copy data of the data acquired from the persistent storage device, the method comprising:

by the second computer, transmitting, to the first computer, confirmation data including the identification information and the version number of the copy data updated in the cache of an own computer;

by the first computer, based on the confirmation data received from the second computer and information stored in the persistent storage device, extracting the identification information and the version number corresponding to the copy data to be written to the persistent storage device, from the confirmation data received from the second computer, and transmitting response data including the extracted identification information and the extracted version number to the second computer; and by the second computer, based on the response data received from the first computer and information stored in the cache, determining the copy data in the cache to be transmitted to the first computer so as to be written to the persistent storage device.

2. The method of controlling data writing to the persistent storage device, according to claim 1, wherein the determining the copy data by the second computer includes determining copy data, which is stored in the cache and has the identification information included in the response data and in which the version number is not older than the version number described in the response data, to be the copy data to be transmitted to the first computer.

3. The method of controlling data writing to the persistent storage device, according to claim 1, wherein the transmitting the response data by the first computer includes transmitting the response data with respect to the confirmation data to both the second computer which transmitted the confirmation data and the second computer which did not transmit the confirmation data.

4. The method of controlling data writing to the persistent storage device, according to claim 1, wherein the transmitting the response data by the first computer includes, based on units of the confirmation data received successively from the second computers and on the information stored in the persistent storage device, extracting, from the units of the confirmation data received from the second computers, the identification information and the version number corresponding to the copy data to be written to the persistent storage device, and transmitting the response data including the extracted the identification information and the extracted version number to the second computers.

5. The method of controlling data writing to the persistent storage device, according to claim 1, wherein
the transmitting the response data by the first computer includes transmitting, to the second computer, the response data describing an offset time with respect to a set of the identification information and the version number included in the response data, the offset time having a value different from a value of another set, and
the second computer controls a transmission time of the determined copy data, based on the offset time described in the response data received from the first computer.

6. The method of controlling data writing to the persistent storage device, according to claim 1, wherein
the transmitting the response data by the first computer includes detecting congestion of a network used for transmission and reception of the copy data with the second computer, and when the congestion is at a certain level or higher, transmitting, to the second computer, the response data describing an offset time with respect to a set of the identification information and the version number included in the response data, the offset time having a value different from a value of another set, and
the second computer controls a transmission time of the determined copy data, based on the offset time described in the response data received from the first computer.

7. The method of controlling data writing to the persistent storage device, according to claim 1, wherein
the first computer and the second computer transmit and receive the confirmation data and the response data over a first network, and transmit and receive the copy data over a second network.

8. A computer system comprising:
a first computer; and
a plurality of second computers, wherein
the first computer includes:
 a persistent storage device that stores a set of data, identification information of the data, and a version number of the data; and
 a first controller,
each of the second computers includes:
 a cache that holds copy data of the data acquired from the persistent storage device; and
 a second controller,
the second controller of the second computer transmits, to the first computer, confirmation data including the identification information and the version number of the copy data updated in the cache of an own computer,
based on the confirmation data received from the second computer and information stored in the persistent storage device, the first controller of the first computer extracts the identification information and the version number corresponding to the copy data to be written to the persistent storage device, from the confirmation data received from the second computer, and transmits response data including the extracted identification information and the extracted version number to the second computer, and
based on the response data received from the first computer and information stored in the cache, the second controller of the second computer determines the copy data stored in the cache to be transmitted to the first computer so as to be written to the persistent storage device.

9. The computer system, according to claim 8, wherein
when determining the copy data, the second controller determines copy data, which is stored in the cache and has the identification information included in the response data and in which the version number is not older than the version number described in the response data, to be the copy data to be transmitted to the first computer.

10. The computer system, according to claim 8, wherein
when transmitting the response data, the first controller transmits response data with respect to the confirmation data to both the second computer which transmitted the confirmation data and the second computer which did not transmit the confirmation data.

11. The computer system, according to claim 8, wherein
when the first controller transmits the response data, based on units of the confirmation data received successively from the second computers and the information stored in the persistent storage device, the first controller extracts, from the units of the confirmation data received from the second computers, the identification information and the version number corresponding to the copy data to be written to the persistent storage device, and transmits the response data including the extracted identification information and the extracted version number to the second computers.

12. The computer system, according to claim 8, wherein
when transmitting the response data, the first controller transmits, to the second computer, the response data describing an offset time with respect to a set of the identification information and the version number included in the response data, the offset time having a value different from a value of another set, and
the second controller controls a transmission time of the determined copy data, based on the offset time described in the response data received from the first computer.

13. The computer system, according to claim 8, wherein
when transmitting the response data, the first computer detects congestion of a network used for transmission and reception of the copy data with the second computer, and when the congestion is at a certain level or higher, the first computer transmits, to the second computer, the response data describing an offset time with respect to a set of the identification information and the version number included in the response data, the offset time having a value different from a value of another set, and
the second controller controls a transmission time of the determined copy data, based on the offset time described in the response data received from the first computer.

14. The computer system, according to claim 8, wherein
the first controller and the second controller transmit and receive the confirmation data and the response data over a first network, and transmit and receive the copy data over a second network.

15. A storage computer connected with a plurality of cache computers, each having a cache, over a network, the storage computer comprising:
a persistent storage device that stores a set of data, identification information of the data, and a version number of the data; and
a controller, wherein
from the cache computer holding, in the cache, copy data of the data stored in the persistent storage device, the controller receives confirmation data including the identification information and the version number of the copy data updated in the cache,
based on the received confirmation data and information stored in the persistent storage device, extracts the identification information and the version number corresponding to the copy data to be written to the persistent storage device, from the confirmation data received from the cache computer, and
transmits response data including the extracted identification information and the extracted version number to the cache computer.

16. A cache computer connected with a storage computer over a network, the storage computer including a persistent storage device that stores a set of data, identification information of the data, and a version number of the data, the cache computer comprising:
a cache that holds copy data of the data acquired from the persistent storage device; and
a controller, wherein
the controller configured to update the cache by copy data, transmit, to the storage computer, confirmation data including the identification information and the version number of the copy data updated in the cache,
receive, from the storage computer, response data including the identification information and the version number corresponding to the copy data to be written to the persistent storage device,
based on the response data received from the storage computer and information stored in the cache, determine the copy data in the cache to be transmitted to the storage computer for writing to the persistent storage device, and
transmit the determined copy data to the storage computer.

17. A non-transitory computer readable medium storing a program comprising instructions for causing a storage computer to function as, the storage computer being connected with a plurality of cache computers, each having a cache, over a network:
a persistent storage device that stores a set of data, identification information of the data, and a version number of the data; and
a controller, wherein
from the cache computer holding, in the cache, copy data of the data stored in the persistent storage device, the controller receives confirmation data including the identification information and the version number of the copy data updated in the cache,
based on the received confirmation data and information stored in the persistent storage device, extracts the identification information and the version number corresponding to the copy data to be written to the persistent storage device, from the confirmation data received from the cache computer, and
transmits response data including the extracted identification information and the extracted version number to the cache computer.

18. A non-transitory computer readable medium storing a program comprising instructions for causing a cache computer, connected with a storage computer, to function as, the storage computer including a persistent storage device that stores a set of data, identification information of the data, and a version number of the data:
a cache that holds copy data of the data acquired from the persistent storage device; and
a controller, wherein
the controller transmits, to the storage computer, confirmation data including the identification information and the version number of the copy data updated in the cache,
receives, from the storage computer, response data including the identification information and the version number corresponding to the copy data to be written to the persistent storage device, and
based on the response data received from the first computer and information stored in the cache, determines the copy data in the cache to be transmitted to the storage computer so as to be written to the persistent storage device.

* * * * *